United States Patent
Bennion

(10) Patent No.: US 10,096,387 B2
(45) Date of Patent: Oct. 9, 2018

(54) FISSIONABLE MATERIAL ENERGY EXTRACTION SYSTEM

(71) Applicant: Robert F. Bennion, West Jordan, UT (US)

(72) Inventor: Robert F. Bennion, West Jordan, UT (US)

( * ) Notice: Subject to any disclaimer, the term of this patent is extended or adjusted under 35 U.S.C. 154(b) by 455 days.

(21) Appl. No.: 14/507,672

(22) Filed: Oct. 6, 2014

(65) Prior Publication Data
US 2016/0099082 A1   Apr. 7, 2016

(51) Int. Cl.
| | | |
|---|---|---|
| G21C 1/24 | (2006.01) | |
| G21C 7/02 | (2006.01) | |
| G21C 1/30 | (2006.01) | |
| G21C 7/34 | (2006.01) | |
| G21D 1/00 | (2006.01) | |
| G21G 4/02 | (2006.01) | |
| G21C 13/04 | (2006.01) | |

(52) U.S. Cl.
CPC ............... *G21C 7/02* (2013.01); *G21C 1/30* (2013.01); *G21C 7/34* (2013.01); *G21D 1/00* (2013.01); *G21G 4/02* (2013.01); *G21C 1/24* (2013.01); *G21C 13/04* (2013.01); *Y02E 30/39* (2013.01)

(58) Field of Classification Search
CPC ... G21C 7/30; G21C 1/24; G21C 1/30; G21C 7/02
USPC ................................................. 376/208, 212
See application file for complete search history.

(56) References Cited

U.S. PATENT DOCUMENTS

| | | | | |
|---|---|---|---|---|
| 2,687,948 A | * | 8/1954 | Gregory ................. | B01J 10/005 422/230 |
| 2,875,143 A | * | 2/1959 | Froman ................... | G21C 1/28 376/208 |
| 2,990,354 A | * | 6/1961 | Anderson ................ | G21C 1/24 376/311 |

(Continued)

OTHER PUBLICATIONS

Ergen, "The Aircraft Reactor Experiment—Physics", Nuclear Science and Engineering, vol. 2, No. 6, pp. 826-840, Nov. 1957. (Year: 1957).*

(Continued)

*Primary Examiner* — Jack W Keith
*Assistant Examiner* — Daniel Wasil
(74) *Attorney, Agent, or Firm* — Kunzler, PC

(57) ABSTRACT

A self-regulating inherently safe apparatus for generating neutrons is described herein that includes a reaction chamber that sustains neutron generation when filled with a liquid fissionable material and an expansion chamber that dampens neutron generation from the liquid fissionable material in response to expansion of the liquid fissionable material into the expansion chamber. Consequently, the apparatus may substantially dampen neutron generation for operating temperatures above a nominal operating temperature without requiring active or external control and inherently limit neutron generation to a maximum desired output power. Also described herein is a self-regulating system and corresponding method for extracting energy from fissionable material that includes a neutron generator that generates neutrons from a liquid fissionable material and a sub-critical collection of fissionable material that generates a non-sustaining plurality of fission events from neutrons received from the neutron generator.

11 Claims, 3 Drawing Sheets

(56) References Cited

U.S. PATENT DOCUMENTS

| | | | | | |
|---|---|---|---|---|---|
| 3,009,866 | A | * | 11/1961 | Fraas | G21C 1/24 376/293 |
| 3,050,454 | A | * | 8/1962 | Barr | G21C 1/24 376/356 |
| 3,136,700 | A | * | 6/1964 | Poppendiek | G21C 1/24 376/352 |
| 3,140,410 | A | * | 7/1964 | McLafferty | G21D 7/02 376/333 |
| 3,549,490 | A | * | 12/1970 | Moore | G21C 7/30 376/208 |
| 4,721,596 | A | * | 1/1988 | Marriott | G21F 9/00 376/189 |
| 6,233,298 | B1 | * | 5/2001 | Bowman | G21C 1/30 376/359 |
| 6,442,226 | B1 | * | 8/2002 | Venneri | G21C 19/48 376/189 |
| 2010/0119027 | A1 | * | 5/2010 | Peterson | G21C 1/24 376/219 |
| 2013/0005200 | A1 | * | 1/2013 | Mayburd | G21D 7/00 440/18 |
| 2014/0105349 | A1 | * | 4/2014 | Nygaard | G21C 1/24 376/331 |

OTHER PUBLICATIONS

Briant, "The aircraft reactor experiment—design and construction", Nucl. Sci. Eng 2, No. 6 (1957), p. 804-825. (Year: 1957).*
Ergen, "The Aircraft Reactor Experiment—Physics", Nuclear Science and Engineering: 2 (1957), p. 826-840. (Year: 1957).*
Moir, "Recommendations for a restart of molten salt reactor development", Energy Conversion and Management, 49, No. 7 (2008), p. 1849-1858. (Year: 2008).*
Khokhlov, "Evaluating physical properties of molten salt reactor fluoride mixtures", Journal of fluorine chemistry, 130, No. 1 (2009): 30-37. (Year: 2009).*
Bettis, "The aircraft reactor experiment—design and construction", Nucl. Sci. Eng 2, No. 6 (1957), p. 804-825. (Year: 1957).*
Savage, "Components of the fused-salt and sodium circuits of the aircraft reactor experiment", ORNL-2348, (1958). (Year: 1958).*
Alexander, "Molten Salt Fast Reactors", In Proc. Conf. Breeding, Economics and Safety in Large Fast Power Reactors, (1963), p. 553. (Year: 1963).*
Sutcliffe, "Fissile materials from nuclear arms reductions: A question of disposition", CONF-910208; CTS-31-92, Lawrence Livermore National Lab (1991), p. 23-29. (Year: 1991).*

* cited by examiner

FISSIONABLE MATERIAL ENERGY EXTRACTION SYSTEM

BACKGROUND OF THE INVENTION

Field of the Invention

The claimed invention relates to systems for inherently safe extraction of energy from fissionable material.

Description of the Related Art

Currently available nuclear reactors are subject to catastrophic failures and meltdowns particular when natural disasters occur such as earthquakes and tsunamis. Equipment failure and power outages are also threats to safe management of such facilities.

BRIEF SUMMARY OF THE INVENTION

The present invention has been developed in response to the present state of the art, and in particular, in response to the problems and needs in the art that have not yet been fully solved by currently available nuclear energy systems. Accordingly, a number of embodiments and configurations are described herein that overcome shortcomings in the art.

For example, as disclosed herein a self-regulating inherently safe apparatus for generating neutrons includes a reaction chamber that sustains neutron generation when filled with a liquid fissionable material and an expansion chamber that dampens neutron generation from the liquid fissionable material in response to expansion of the liquid fissionable material into the expansion chamber. Consequently, the self-regulating inherently safe apparatus may substantially dampen neutron generation for operating temperatures above a nominal operating temperature without requiring active or external control.

The self-regulating inherently safe apparatus for generating neutrons may also include a drainage tube for draining liquid fissionable material from the reaction chamber and into a storage vessel. The storage vessel may also have a port for receiving a displacement gas of sufficient pressure that the liquid fissionable material remains within the reaction chamber during steady state operation. Upon failure to maintain the sufficient pressure in the storage vessel, the liquid fissionable material may drain into the storage vessel from the reaction chamber and thereby inhibit sustained neutron generation.

Also described herein is a self-regulating system for extracting energy from fissionable material that includes a neutron generator that generates neutrons from a liquid fissionable material and a sub-critical collection of fissionable material proximate to the neutron generator. The sub-critical collection of fissionable material may be configured to generate a non-sustaining plurality of fission events from neutrons received from the neutron generator. The system may also include a heat extraction sub-system for extracting heat from the sub-critical collection of fissionable material and a power generation subsystem for generating power from the extracted heat.

Furthermore, a method for extracting energy from fissionable material is described herein that includes providing a sub-critical collection of fissionable material configured to support a non-sustaining plurality of fission events from neutrons impinging thereon and placing an inherently self-regulating neutron generator proximate to the sub-critical collection of fissionable material.

It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of materials, structural configurations, processes etc., to provide a thorough understanding of embodiments of the invention. One skilled in the relevant art will recognize, however, that the invention may be practiced without one or more of the specific details, or with other materials, configurations, processes and so forth. In other instances, well-known structures, materials, or processes are not shown or described in detail to avoid obscuring aspects of the invention.

Figure 1:
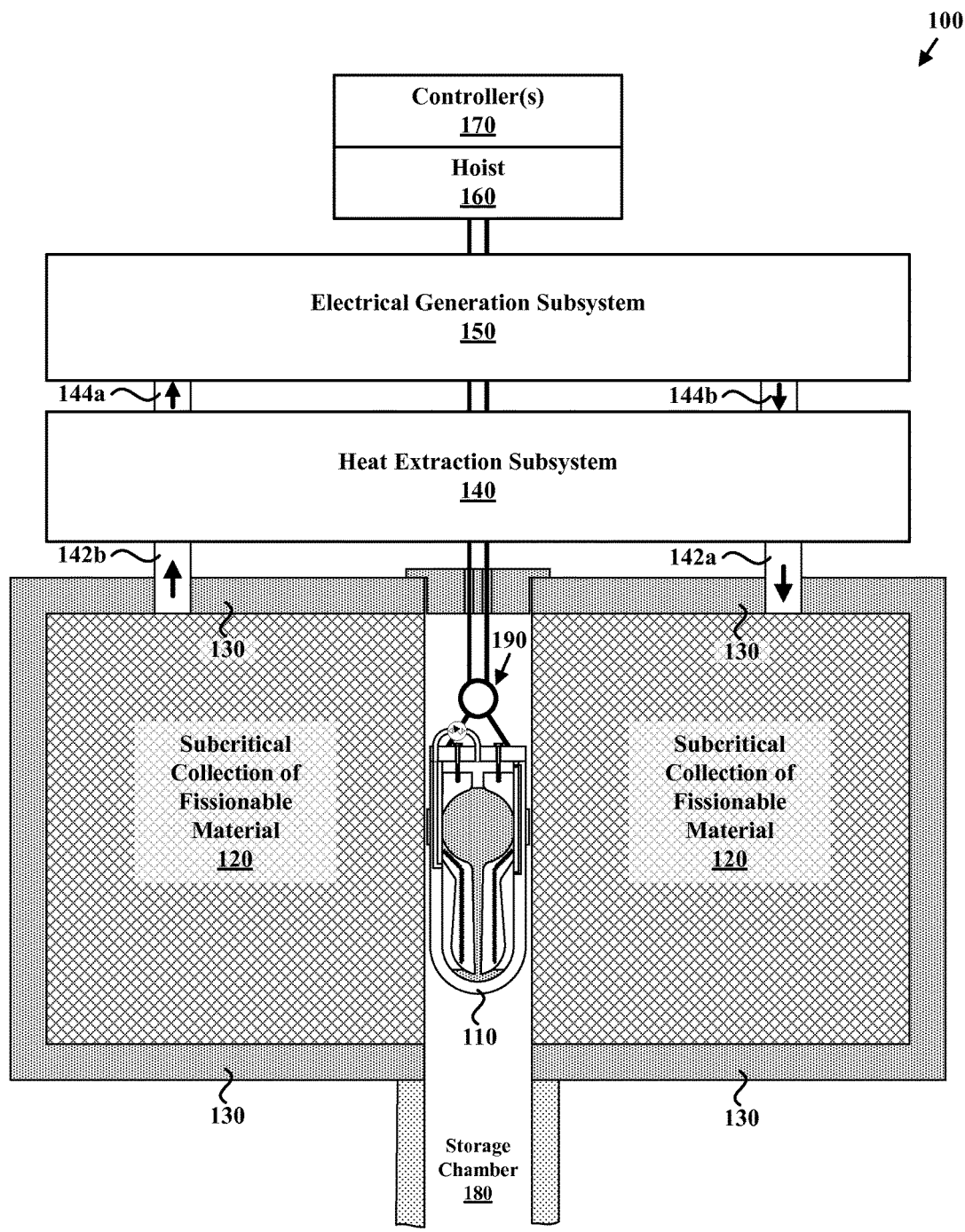
FIG. 1 is a block diagram depicting a fissionable material energy extraction system that is consistent with one or more embodiments of the claimed inventions.

FIG. 1 is a block diagram depicting a fissionable material energy extraction system 100 that is consistent with one or more embodiments of the claimed inventions. As depicted, the fissionable material energy extraction system 100 includes a neutron generator 110, a subcritical collection of fissionable material 120, an encasement 130, a heat extraction subsystem 140, an electrical generation subsystem 150, a hoist 160, one or more controllers 170, a storage chamber 180, and hoist coupling hardware 190. The fissionable material energy extraction system 100 enables inherently safe energy extraction while providing a number of catastrophic failure protection mechanisms that do not require active or external control.

The neutron generator 110 contains a liquid fissionable material 112 that under selected conditions passively radiates neutrons (not shown) via a continuous fission chain reaction. The neutrons penetrate the subcritical collection of fissionable material which is configured to produce a non-sustaining (i.e. finite) sequence of fission events per penetrating neutron. Consequently, the subcritical collection of fissionable material 120 amplifies the energy produced by the neutron generator without developing a self-sustaining or runaway nuclear reaction. In certain embodiments, the subcritical collection of fissionable material 120 comprises materials previously used in a reactor or extracted from a weapon.

The amount of liquid fissionable material 112 required to generate a continuous fission reaction within the neutron generator 110 may be very small compared to the subcritical collection of fissionable material 120. In many embodiments, the liquid fissionable material 112 comprises less than 20 kg of active material. In certain embodiments, the neutron generator 110 passively radiates neutrons via a continuous fission chain reaction over a normal-operation temperature range of at least 100 degrees Celsius. In other embodiments, the normal-operation temperature range is at least 250 degrees Celsius.

The encasement 130 may absorb and/or reflect nuclear radiation and thereby prevent nuclear radiation from escaping the encasement into the facility. A containment structure (not shown) such as a dome may further protect the local environment from nuclear radiation. In certain embodiments, nuclear reflections provided by the encasement 130 facilitate greater energy amplification within the fissionable material 120 and reduce the required size of the subcritical collection of fissionable material 120.

Heat may be generated within the subcritical collection 120 by the non-sustaining sequence of fission events. The heat extraction subsystem 140 may receive a thermal transfer fluid via a thermal transfer flow 142 that is circulated through the subcritical collection 120. The thermal transfer flow 142 may extract heat from the subcritical collection 120 to provide a heated fluid flow 142b. In one embodiment, the heat extraction subsystem 140 includes one or more heat exchangers (not shown) that heat and/or vaporize a working fluid to provide a working fluid flow 144.

The heat extraction subsystem 140 may provide the working fluid flow 144 in the form of a heated vapor flow 144a, or the like, to the electrical generation subsystem 150. For example, the electrical generation subsystem 150 may include one or more turbines that are driven by the heated vapor flow 144a. The electrical generation subsystem 150 may condense the heated vapor flow 144a and extract work therefrom to provide a condensed vapor flow 144b.

In some embodiments, the thermal transfer fluid 142 and the working fluid 144 are the same fluid which passes directly to the electrical generation subsystem 150 without passing through heat exchangers. The electrical generation subsystem 150 and the heat extraction system 140 may function cooperatively to cool the thermal transfer fluid and circulate the flow 142 to provide a cooled fluid flow 142a to the subcritical collection of fissionable material.

The hoist 160 may be used to raise or lower the neutron generator 110. For example, the neutron generator 110 may be raised for servicing or disposal, or lowered into the storage and shutdown chamber 180 for storage, or to abort continued operation in response to a threat or emergency. In certain embodiments, elevated temperatures that are above the normal operating range may melt specific elements within the neutron generator 110 and/or the hoist coupling hardware 190 which will cause the neutron generator 110 to drop into the shutdown chamber 180 and abort continued operation.

Figure 2:
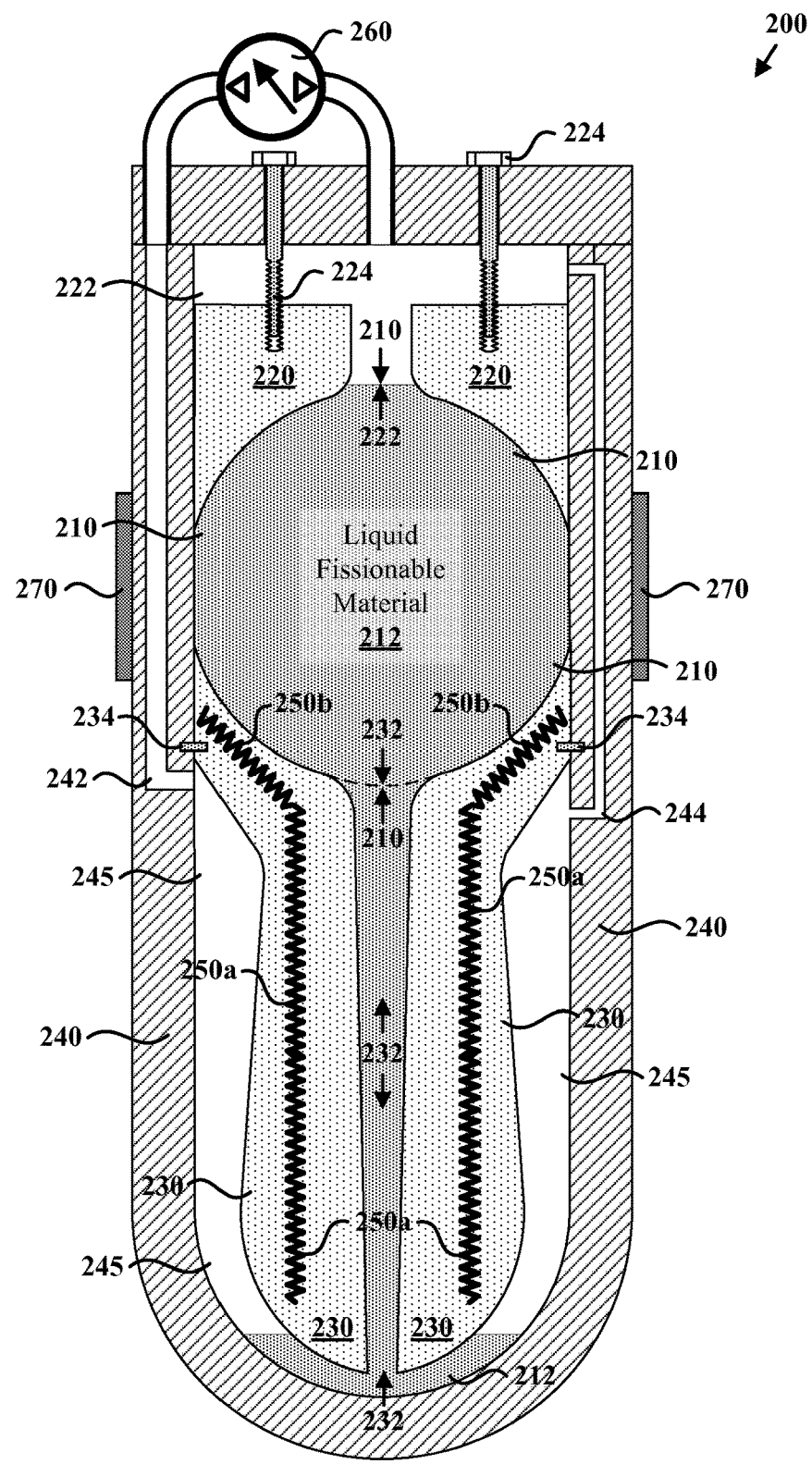
FIG. 2 is a block diagram depicting an inherently safe neutron generator that is consistent with one or more embodiments of the claimed inventions.

FIG. 2 is a block diagram depicting an inherently safe neutron generator 200 that is consistent with one or more embodiments of the claimed inventions. As depicted, the inherently safe neutron generator 200 includes a reaction chamber 210 formed by an upper plug 220 and a lower plug 230, a reaction vessel 240, one or more reaction vessel heaters 250, a displacement gas pump 260, and one or more reflectors 270. The inherently safe neutron generator 200 is one example of the neutron generator 110 shown in FIG. 1.

The reaction chamber 210 is sized and shaped to support continuous fission when filled with a liquid fissionable material 212. The liquid fissionable material 212 maybe a nuclear material or an alloy or solution comprising one or more nuclear materials. The liquid fissionable material 212 may comprise used reactor materials. In one embodiment, the liquid fissionable material 212 comprises non-weapons grade plutonium.

The liquid fissionable material 212 may require heating to bring it to a liquid state and/or maintain a liquid state. In certain embodiments, neutron generation within the fissionable material 212 may produce sufficient heat to at least maintain the fissionable material 212 in a liquid state.

The neutron generation rate of the liquid fissionable material 212 may be dependent on the physical density of the liquid 212 and the volumetric fill factor (e.g. the volume of the material divided by the cube of the mean distance between particles) of the container(s) which contain(s) the liquid fissionable material 212. In certain embodiments, elements of the neutron generator 200 may be sized and shaped to decrease the volumetric fill factor of the fissionable material 212 in response to an increase in temperature.

For example, the reaction chamber 210 and an expansion chamber 222 maybe sized and shaped such that increasing the temperature of the liquid fissionable material beyond a nominal operating temperature will reduce the physical density of the liquid fissional material 212 and expand the liquid 212 into the expansion chamber 222 formed within the upper plug 220. In response thereto, the volumetric fill factor of the fissionable material 212 may also be reduced. The change in the volumetric fill factor of the neutron generator 200 in response to increases in temperature of the liquid fissionable material 212 may dampen the reaction rate of the liquid fissionable material 212 to a rate that maintains the neutron generator 210 within an acceptable operating neutron emission rate and temperature range.

The shape and volume of the reaction chamber 210 and the expansion chamber 222 may be selected for (passively) controlled damping of neutron generation for temperatures above a selected operating temperature. Therefore, the neutron generator 200 may have inherent passive feedback that maintains the neutron generation output power and the operating temperature at levels that are within an acceptable operating range without requiring active or external control. In one embodiment, the neutron generator 200 is inherently limited to releasing less than a maximum desired output power.

In certain embodiments, the reaction chamber 210 and the expansion chamber 212 are sized and shaped to maintain neutron generation via a continuous fission chain reaction over an extended steady state operating range. In one embodiment, the steady state operating range is at least 100 degrees Celsius. In another embodiment, the steady state operating range is at least 250 degrees Celsius. In the depicted embodiment, one or more chamber volume adjusters 224 may be used to fine tune the size of the reaction chamber 210 and the steady state operating range.

Certain elements of the neutron generator 200 may melt at a selected failsafe temperature in order to abort continued operation. For example, the material of the chamber volume adjusters 224 or a portion thereof may be selected to melt at the selected failsafe temperature. Upon melting of the adjusters 224 or a similar failsafe element, the upper plug 220 may drop within the reaction vessel and reduce the size of the reaction chamber to a volume that is insufficient to sustain neutron generation.

The lower plug 230 may be held in place within the reaction vessel 240 by one or more fastening elements 234. A drainage tube 232 enables the liquid fissionable material 212 to drain from the reaction chamber and into a storage vessel 245. In the depicted embodiment, the drainage tube is formed into the lower plug 230 and has a tapered cross section to reduce deformation of the lower plug 230 in response to solidification of the liquid fissionable material 212.

The storage vessel 245 may be shaped and sized to substantially inhibit neutron generation from liquid fissionable material contained therein. In the depicted embodiment, the reaction vessel 240 and the (lower outer surface of the) lower plug 230 are rotationally symmetric and form the storage vessel 245. As shown in FIG. 2, the shape of the storage vessel 245 may also be tapered to reduce deformation of the storage vessel 245 and/or the reaction vessel 240 upon solidification of the liquid fissionable material 212.

The reaction vessel heaters 250 may include storage vessel heaters 250a and reaction chamber heaters 250b that are used to maintain the fissionable material in a liquid form. The reaction vessel heaters 250 may maintain the reaction vessel in general, and the reaction chamber in particular, at or above a minimum operating temperature.

The pump 260 may maintain an operating pressure differential between the storage vessel 245 and the expansion chamber 222 by pumping a displacement gas or the like into the storage vessel 245 via the pumping port 242. The operating pressure differential may determine the amount of liquid fissionable material 212 that is within the reaction chamber 210 and the expansion chamber 222. The operating pressure differential maybe selected to at least fill the reaction chamber with liquid fissionable material 212. In certain embodiments, the operating pressure differential may determine a nominal neutron generation rate and operating temperature. The operating pressure differential may be set by a pressure limiting device within the pump 260 or elsewhere. In certain embodiments, the operating pressure differential may be set and/or monitored by a reaction rate controller (e.g. one of the controllers 170) or the like.

In the depicted embodiment, a leakage channel 244 connects the storage vessel 245 and the expansion chamber 222. The inclusion of the leakage channel 244 provides a failsafe mechanism in that pumping must be continued to maintain the operating pressure differential. In the absence of continued pumping—due to equipment failure, loss of control, loss of power, or the like—the liquid fissionable material 212 will drain from the reaction chamber 210 into the storage vessel 245 via the drainage tube 232. Upon drainage, the liquid fissionable material 212 will no longer provide sustained neutron generation and the neutron generator 200 will be in a non-operating and safe state. One of skill in the art will appreciate that the above described failsafe mechanism does not inhibit (during normal operation) the volumetric fill factor feedback mechanism previously described.

In certain embodiments, the neutron generator 200 may include one or more reflectors 270. The reflectors 270 may reflect a portion of the neutrons emitted from the liquid fissionable material within the reaction chamber 210. Reflecting a portion of the emitted neutrons may enhance neutron generation within the reaction chamber 210 and reduce the required size of the reaction chamber 210. Furthermore, the reflectors 270 may be less responsive to neutrons emitted from the expansion chamber 222 and the drainage tube 232 and thereby enhance the dampening effect of the expansion chamber 222 on the liquid fissionable material 212.

Figure 3:
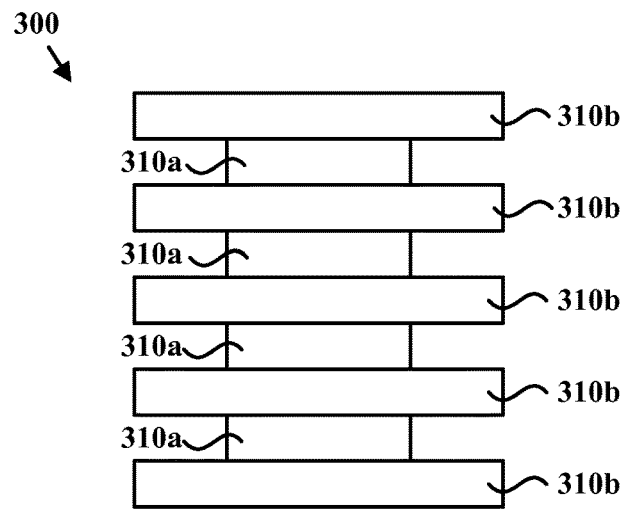
FIG. 3 is a schematic diagram depicting a fissionable material stack that is consistent with one or more embodiments of the claimed inventions.

FIG. 3 is a schematic diagram depicting a fissionable material stack 300 that is consistent with one or more embodiments of the claimed inventions. The fissionable material stack comprises disks of alternating diameters. As depicted, the stack includes smaller diameter disks 310a and larger diameter disks 310b. The alternating diameter disks 310 may facilitate heat transfer with a liquid coolant while providing structural stability. In certain embodiments, the fissionable material stack 300 comprises materials previously used in a nuclear reactor.

Figure 4:
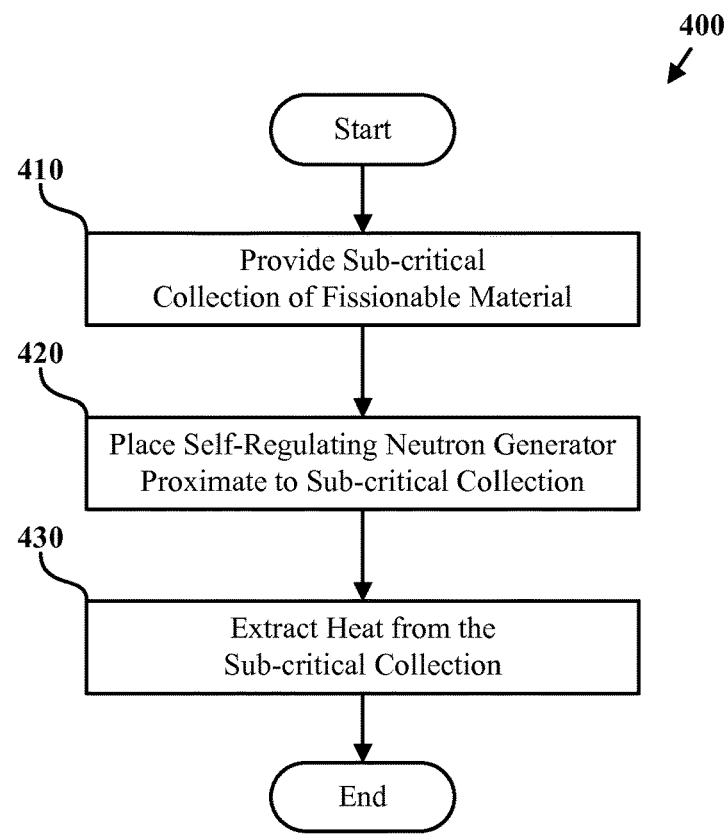
FIG. 4 is a flow chart diagram depicting an inherently safe fissioning method that is consistent with one or more embodiments of the claimed inventions.

FIG. 4 is a flow chart diagram depicting an inherently safe fissioning method 400 that is consistent with one or more embodiments of the claimed inventions. As depicted, the method 400 includes providing 410 a sub-critical collection of fissionable material, placing 420 a neutron generator proximate to the sub-critical collection, and extracting 430 heat from the sub-critical collection. The method 400 may be conducted in conjunction with the fissionable material energy extraction system 100 or the like.

Providing 410 may include providing a sub-critical collection of fissionable material that is configured to support a non-sustaining plurality of fission events from neutrons impinging thereon. Placing 420 may include placing (proximate to the sub-critical collection of fissionable material) a neutron generator such as the neutron generator 200 that generates neutrons by a continuous fission chain reaction. In certain embodiments, the continuous fission chain reaction occurs within a liquid fissionable material such as liquid plutonium. The neutron generator may comprise less than 20 kg of active material and be inherently self-regulating. The neutron generator may substantially dampen neutron generation for temperatures above a selected operating temperature without active or external control. Extracting 430 may include circulating a coolant or working fluid through the subcritical collection that is used to generate electrical power, heat buildings, or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A self-regulating inherently safe apparatus for generating neutrons, the apparatus comprising:
   a reaction chamber filled with a liquid fissionable material, the reaction chamber sized and shaped to provide a volumetric fill ratio for the liquid fissionable material that sustains neutron generation when the liquid fissionable material is below a selected temperature;
   an expansion chamber for receiving liquid fissionable material from the reaction chamber in response to expansion of the liquid fissionable material when the liquid fissionable material is above the selected temperature;
   wherein the expansion chamber is shaped to reduce the volumetric fill ratio of the liquid fissionable material and thereby dampen neutron generation from the liquid fissionable material in response to non-evaporative expansion of the liquid fissionable material into the expansion chamber when the liquid fissionable material is above the selected temperature;
   a drainage tube for draining liquid fissionable material from the reaction chamber into a storage vessel;
   a displacement gas pump configured to pressurize the storage vessel with a displacement gas and maintain liquid fissionable material within the reaction chamber; and
   a leakage channel for leaking the displacement gas from the storage vessel and thereby cause the liquid fissionable material to flow into the storage vessel when the storage vessel is no longer pressurized by the pump.

2. The apparatus of claim 1, wherein the liquid fissionable material comprises non-weapons grade plutonium.

3. The apparatus of claim 2, further comprising a reactor temperature controller configured to maintain the reaction chamber at a minimum operating temperature.

4. The apparatus of claim 1, wherein the shape and volume of the reaction chamber and the expansion chamber are selected to reduce neutron generation for temperatures above a selected operating temperature.

5. The apparatus of claim 1, wherein the storage vessel is shaped to provide a volumetric fill ratio for the liquid fissionable material that substantially inhibits neutron generation when the liquid fissionable material is contained therein.

6. The apparatus of claim 5, further comprising a reaction rate controller configured to control a neutron generation rate from liquid fissionable material contained within the reaction chamber by adjusting the pressure of the displacement gas within the storage vessel via the displacement gas pump.

7. The apparatus of claim 5, further comprising a storage vessel heater configured to heat liquid fissionable material contained within the storage vessel.

8. The apparatus of claim 1, further comprising a sub-critical collection of fissionable material proximate to the reaction chamber, the sub-critical collection of fissionable material configured to support a non-sustaining plurality of fission events per neutron received from the reaction chamber.

9. The apparatus of claim 8, wherein the sub-critical collection comprises a plurality of stacked disks of alternating diameters.

10. The apparatus of claim 8, wherein the sub-critical collection of fissionable material comprises materials previously used in a nuclear reactor.

11. A system for extracting energy from fissionable material, the system comprising:
    a reaction vessel comprising:
    a reaction chamber filled with a liquid fissionable material comprising non-weapons grade plutonium, the reaction chamber sized and shaped to sustain neutron generation when the liquid fissionable material is below a selected temperature,
    an expansion chamber for receiving liquid fissionable material from the reaction chamber in response to expansion of the liquid fissionable material when the liquid fissionable material is above the selected temperature,
    wherein the expansion chamber is shaped to reduce the volumetric fill ratio of the liquid fissionable material and thereby dampen neutron generation from the liquid fissionable material without external or active control in response to non-evaporative expansion of the liquid fissionable material into the expansion chamber when the liquid fissionable material is above the selected temperature;
    a drainage tube for draining liquid fissionable material from the reaction chamber into a storage vessel;
    a displacement gas pump configured to pressurize the storage vessel with a displacement gas and maintain liquid fissionable material within the reaction chamber; and
    a leakage channel for leaking the displacement gas from the storage vessel and thereby cause the liquid fissionable material to flow into the storage vessel when the storage vessel is no longer pressurized by the pump; and
    a sub-critical collection of fissionable material proximate to the reaction chamber, the sub-critical collection of fissionable material configured to support a non-sustaining plurality of fission events from neutrons received from the reaction chamber.

* * * * *